United States Patent
Wang et al.

(10) Patent No.: US 11,405,906 B2
(45) Date of Patent: Aug. 2, 2022

(54) DOWNLINK CONTROL INFORMATION TRANSMISSION AND RECEPTION METHODS AND DEVICES

(71) Applicant: CHINA ACADEMY OF TELECOMMUNICATIONS TECHNOLOGY, Beijing (CN)

(72) Inventors: Lei Wang, Beijing (CN); Ekpenyong Tony, Beijing (CN); Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 169 days.

(21) Appl. No.: 16/623,370

(22) PCT Filed: May 10, 2018

(86) PCT No.: PCT/CN2018/086381
§ 371 (c)(1),
(2) Date: Dec. 16, 2019

(87) PCT Pub. No.: WO2018/228096
PCT Pub. Date: Dec. 20, 2018

(65) Prior Publication Data
US 2020/0187172 A1    Jun. 11, 2020

(30) Foreign Application Priority Data
Jun. 16, 2017 (CN) ............ 201710458595.9

(51) Int. Cl.
*H04B 7/06* (2006.01)
*H04W 72/04* (2009.01)
(Continued)

(52) U.S. Cl.
CPC ......... *H04W 72/042* (2013.01); *H04L 5/0053* (2013.01); *H04W 16/28* (2013.01)

(58) Field of Classification Search
CPC . H04W 72/042; H04W 16/28; H04W 72/046; H04L 5/0053; H04B 7/046; H04B 7/0617; H04B 7/0695; H04B 7/0408
See application file for complete search history.

(56) References Cited

U.S. PATENT DOCUMENTS

| 5,894,598 A | 4/1999 | Shoki |
| 10,812,125 B1 * | 10/2020 | Badic ................. H04W 72/085 |

(Continued)

FOREIGN PATENT DOCUMENTS

| CN | 103931112 A | 7/2014 |
| CN | 104350695 A | 2/2015 |

(Continued)

OTHER PUBLICATIONS

CN 104620551—Apparatus and Method for Control Channel Beam Management in a Wireless System With a Large Number of Antennas, Auther—Li Yang, Publication Date—May 13, 2015 (Year: 2015).*

(Continued)

*Primary Examiner* — Diane L Lo
*Assistant Examiner* — Abusayeed M Haque
(74) *Attorney, Agent, or Firm* — Kilpatrick Townsend & Stockton, LLP

(57) ABSTRACT

Disclosed are downlink control information transmission and reception methods and devices, for solving the technical problem of excessive high power consumption caused by high workload of terminal monitoring in the case of higher frequency. The method comprises: a base station determines at least one beam direction for transmitting downlink control information of a terminal, and generates first downlink (Continued)

control channel configuration information according to at least one determined beam direction, the first downlink control channel configuration information being used for indicating the beam direction of the downlink control information transmitted by the base station to the terminal; after transmitting the first downlink control channel configuration information to the terminal, the base station transmits the downlink control information to the terminal in the at least one beam direction.

23 Claims, 6 Drawing Sheets

(51) Int. Cl.
*H04B 7/0408* (2017.01)
*H04L 5/00* (2006.01)
*H04W 16/28* (2009.01)

(56) References Cited

U.S. PATENT DOCUMENTS

| | | | |
|---|---|---|---|
| 2014/0153423 A1 | 6/2014 | Shin et al. | |
| 2016/0142189 A1* | 5/2016 | Shin | H04L 5/0051 370/329 |
| 2017/0302352 A1* | 10/2017 | Islam | H04L 25/0204 |
| 2019/0334599 A1* | 10/2019 | Davydov | H04L 5/0051 |
| 2020/0059346 A1* | 2/2020 | Yoo | H04L 1/0026 |
| 2020/0099437 A1* | 3/2020 | Harada | H04W 72/046 |
| 2021/0051502 A1* | 2/2021 | Yamada | H04L 5/0053 |
| 2021/0120557 A1* | 4/2021 | Takeda | H04L 1/1861 |
| 2021/0218515 A1* | 7/2021 | Yi | H04W 72/0446 |

FOREIGN PATENT DOCUMENTS

| | | |
|---|---|---|
| CN | 104620551 A | 5/2015 |
| CN | 104620621 A | 5/2015 |
| CN | 105191174 A | 12/2015 |
| CN | 106559886 A | 4/2017 |
| CN | 106851846 A | 6/2017 |
| EP | 3358777 | 8/2018 |
| WO | 2013165149 | 11/2013 |
| WO | 2017071473 | 5/2017 |

OTHER PUBLICATIONS

Jeong Cheol et al., "Random Access in Millimeter-Wave Beamforming Cellular Networks: Issues and Approaches", IEEE Communications Magazine, Jan. 31, 2015.

Huawei et al., "DL Beam Management", 3GPP TSG RAN WG1 #88bis, R1-1704229, Mar. 25, 2017.

3GPP, "Study on New Radio (NR) Access Technology", 3GPP TR38.912 V1.0.0., Mar. 16, 2017.

* cited by examiner

DOWNLINK CONTROL INFORMATION TRANSMISSION AND RECEPTION METHODS AND DEVICES

This application is a National Stage of International Application No. PCT/CN2018/086381, filed on May 10, 2018, which claims priority to China Patent Application No. 201710458595.9, filed on Jun. 16, 2017 and entitled "Downlink Control Information Transmission and Reception Methods and Devices", both of which are hereby incorporated by reference in their entireties.

FIELD

The present disclosure relates to the technical field of communications, and particularly relates to downlink control information transmission and reception methods and devices.

BACKGROUND

At present, in a long term evolution (LTE) communication system, a physical downlink control channel (PDCCH) is used for carrying downlink control information (DCI) and other control information. Since frequency-domain resources used by the current LTE communication system have a lower frequency, an omnidirectional antenna may be used to transmit the downlink control information, and correspondingly, a terminal may monitor and receive the downlink control information in a random direction.

In a future wireless communication system, such as a 5 Generation (5G) mobile communication technology, in order to increase the utilization rate of the frequency domain resources, a band with a higher frequency, such as 6 GHz or above or dozens of GHz, may be also used to transmit data. When the high-frequency band transmits the data, a signal of the high-frequency band is attenuated faster, so that in order to resist the faster attenuation to guarantee the communication quality, data transmission needs to be performed in a beam forming manner. Since the signal strength outside a beam direction is extremely low, corresponding information may be only monitored and received in a correct beam direction. Therefore, a current manner of the terminal for monitoring and receiving the downlink control information in the random direction is not applicable to the future wireless communication system. Meanwhile, if the terminal is still in accordance with the mode in the prior art, namely the terminal monitors the downlink control information in the random direction, since the workload of terminal monitoring under the higher-frequency band in the future wireless communication system is greater than the workload under a lower-frequency band in the prior art, the electricity consumption during monitoring will be increased, which makes the terminal have low endurance capacity.

SUMMARY

An embodiment of the present disclosure provides downlink control information transmission and reception methods and devices, for solving the technical problem of excessive high power consumption caused by high workload of terminal monitoring in the case of higher frequency.

According to a first aspect, a downlink control information transmission method is provided, including:

determining, by a base station, at least one beam direction for transmitting downlink control information of the terminal, and generating, by the base station, first downlink control channel configuration information according to at least one determined beam direction, the first downlink control channel configuration information being used for indicating a beam direction of the downlink control information transmitted by the base station to the terminal; and transmitting, by the base station, the downlink control information to the terminal in the at least one beam direction after the base station transmits the first downlink control channel configuration information to the terminal.

In one embodiment, before the determining, by a base station, at least one beam direction for transmitting downlink control information of the terminal, the method further includes: determining, by the base station, beam direction information through a beam management procedure, the beam direction information indicating the beam direction in which the base station transmits the control information to the terminal; or, determining, by the base station, the beam direction information in a random access procedure of the terminal, including: receiving, by the base station, a preamble sequence transmitted by the terminal. The preamble sequence carries SSB corresponding information received by the terminal. The determining, by the base station, the at least one beam direction for transmitting the downlink control information of the terminal includes: determining, by the base station, the at least one beam direction for transmitting the downlink control information of the terminal according to the beam direction information.

In one embodiment, the first downlink control channel configuration information includes QCL information. When the QCL information takes a reference signal of the beam management procedure as a base signal, the terminal demodulates difference information between a reference signal of a downlink control channel carrying the downlink control information and the reference signal of the beam management procedure of the terminal. Or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates difference information between the reference signal of the downlink control channel carrying the downlink control information and the reference signal of the downlink synchronization procedure or demodulates difference information between the reference signal of the downlink control channel carrying the downlink control information and the demodulation reference signal used for demodulating the broadcast information carried by the physical broadcast channel.

In one embodiment, the generating, by the base station, the first downlink control channel configuration information according to the determined at least one beam direction includes:

distributing, by the base station according to the determined at least one beam direction, a beam direction for at least one control resource set configured by the base station for the terminal, and generating the first downlink control channel configuration information according to a result of distribution of the beam direction for at least one control resource set. The at least one control resource set is configured to transmit the downlink control information. The beam directions distributed for different control resource sets in the at least one control resource set are the same or different. The beam directions distributed for different candidates of the downlink control channel carrying the downlink control information in each control resource set are the same or different.

In one embodiment, after the distributing, by the base station according to the at least one determined beam direction, a beam direction for at least one control resource set configured by the base station for the terminal, the method further includes: configuring, by the base station, one or more pieces of QCL information for the at least one control resource set.

In one embodiment, the configuring, by the base station, one or more pieces of QCL information for the at least one control resource set includes: configuring, by the base station, different pieces of QCL information for different candidates of the downlink control channels at different aggregation levels in each control resource set, or configuring, by the base station, different pieces of QCL information for different candidates of the downlink control channels at different aggregation levels in each control resource set, or configuring, by the base station, different pieces of QCL information for each candidate in each control resource set, or configuring, by the base station, multiple different pieces of QCL information for each candidate in each control resource set.

In one embodiment, the transmitting, by the base station, the first downlink control channel configuration information to the terminal includes: transmitting, by the base station, the first downlink control channel configuration information to the terminal through a radio resource control signaling, or transmitting, by the base station, the first downlink control channel configuration information to the terminal through a message 2 or a message 4 in a random access procedure.

In one embodiment, after transmitting, by the base station, the first downlink control channel configuration information to the terminal, the method further includes: transmitting, by the base station, second downlink control channel configuration information for instructing the base station to adjust the at least one beam direction for transmitting the downlink control information of the terminal if the base station adjusts the at least one beam direction for transmitting the downlink control information of the terminal.

In one embodiment, the transmitting, by the base station, second downlink control channel configuration information for instructing the base station to adjust the at least one beam direction for transmitting the downlink control information of the terminal includes: transmitting, by the base station, the second downlink control channel configuration information to the terminal through a L1 signaling or an MAC CE.

According to a second aspect, a downlink control information reception method is provided, including: receiving, by a terminal, first downlink control channel configuration information transmitted by a base station, the first downlink control channel configuration information including information of at least one beam direction determined by the base station and configured to transmit downlink control information of the terminal; determining, by the terminal, the at least one beam direction according to the first downlink control channel configuration information; and monitoring and receiving, by the terminal, the downlink control information in the at least one beam direction.

In one embodiment, the determining, by the terminal, the at least one beam direction according to the first downlink control channel configuration information includes: determining, by the terminal according to the first downlink control channel configuration information, a beam direction distributed by the base station for at least one control resource set. The at least one control resource set configured by the base station for the terminal and configured to transmit the downlink control information. The base station distributes the same or different beam directions for different control resource sets in the at least one control resource set. The beam directions distributed for different candidates of a downlink control channel carrying the downlink control information in each control resource set are the same or different.

In one embodiment, the first downlink control channel configuration information includes QCL information. When the QCL information takes a reference signal of the beam management procedure as a base signal, the terminal demodulates relative parameter information between a reference signal of the downlink control channel carrying the downlink control information and the reference signal of the beam management procedure of the terminal. Or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates relative parameter information between the reference signal of the downlink control channel carrying the downlink control information and the reference signal of the downlink synchronization procedure or the terminal demodulates relative parameter information between the reference signal of the downlink control channel carrying the downlink control information and the demodulation reference signal used for demodulating the broadcast information carried by the physical broadcast channel.

In one embodiment, the determining, by the terminal according to the first downlink control channel configuration information, a beam direction distributed by the base station for at least one control resource set includes: determining, by the terminal according to the QCL information, the beam direction corresponding to each control resource set when the terminal determines that the base station configures one piece of QCL information for the at least one control resource set, or determining, by the terminal according to the QCL information, beam directions corresponding to the downlink control channels at different aggregation levels in each control resource set or beam directions corresponding to different candidates of the downlink control channels at different aggregation levels or multiple beam directions corresponding to each candidate in each control resource set when the terminal determines that the base station configures multiple pieces of QCL information for the at least one control resource set.

In one embodiment, before the receiving, by the terminal, the first downlink control channel configuration information transmitted by the base station, the method further includes: generating, by the terminal, beam direction information according to received signal strength in different beam directions of the base station; and transmitting, by the terminal, the beam direction information to the base station, the beam direction information indicating the beam direction in which the base station transmits the control information to the terminal.

In one embodiment, the transmitting, by the terminal, the beam direction information to the base station includes: transmitting, by the terminal, the beam direction information to the base station in a beam management procedure of the base station, or transmitting, by the terminal, the beam direction information to the base station in a random access procedure.

In one embodiment, the receiving, by the terminal, the first downlink control channel configuration information transmitted by the base station includes: receiving, by the terminal, the first downlink control channel configuration information contained in a radio resource control signaling transmitted by the base station, or receiving, by the terminal, the first downlink control channel configuration information contained in a message 2 or a message 4 transmitted by the base station in a random access procedure.

In one embodiment, the method further includes: receiving, by the terminal, second downlink control channel configuration information transmitted by the base station, the second downlink control channel configuration information being used for instructing the base station to adjust at least one beam direction for transmitting the downlink control information of the terminal; determining, by the terminal, at least one adjusted beam direction according to the second downlink control channel configuration information; and monitoring and receiving, by the terminal, the downlink control information in at least one adjusted beam direction.

In one embodiment, the receiving, by the terminal, second downlink control channel configuration information transmitted by the base station includes: receiving, by the terminal, second downlink control channel configuration information transmitted by the base station through a L1 signaling or an MAC CE.

According to a third aspect, a downlink control information transmission device is provided, including: a first determining device, configured to determine at least one beam direction for transmitting downlink control information of a terminal, and generating first downlink control channel configuration information according to the determined at least one beam direction, the first downlink control channel configuration information being used for indicating a beam direction of the downlink control information transmitted by the base station to the terminal; and a first transmitting device, configured to transmit the downlink control information to the terminal in the at least one beam direction after the first downlink control channel configuration information is transmitted to the terminal.

In one embodiment, the first determining device is further configured to determine beam direction information through a beam management procedure before determining the at least one beam direction for transmitting the downlink control information of the terminal, the beam direction information indicating the beam direction in which the base station transmits the control information to the terminal; or, determining the beam direction information in a random access procedure of the terminal. The first determining device determines the at least one beam direction for transmitting the downlink control information of the terminal by determining the at least one beam direction for transmitting the downlink control information of the terminal according to the beam direction information.

In one embodiment, the first downlink control channel configuration information includes QCL information. When the QCL information takes a reference signal of the beam management procedure as a base signal, the terminal demodulates difference information between a reference signal of the downlink control channel carrying the downlink control information and the reference signal of the beam management procedure of the terminal. Or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates difference information between the reference signal of the downlink control channel carrying the downlink control information and the reference signal of the downlink synchronization procedure or the terminal demodulates difference information between the reference signal of the downlink control channel carrying the downlink control information and the demodulation reference signal used for demodulating the broadcast information carried by the physical broadcast channel.

In one embodiment, the device further includes a distribution device. The distribution device is configured to distribute, according to at least one determined beam direction, a beam direction for at least one control resource set configured by the base station for the terminal. The at least one control resource set is configured to transmit the downlink control information. The beam directions distributed for different control resource sets in the at least one control resource set are the same or different. The beam directions distributed for different candidates of the downlink control channel carrying the downlink control information in each control resource set are the same or different. The first determining device generates the first downlink control channel configuration information according to the determined at least one beam direction by generating the first downlink control channel configuration information according to a result of the distribution of the beam direction by the distribution device for the at least one control resource set.

In one embodiment, the device further includes a configuration device. The configuration device is configured to: configure one or more pieces of QCL information for the at least one control resource set after the distribution device distributes, according to at least one determined beam direction, the beam direction for at least one control resource set configured by the base station for the terminal.

In one embodiment, the configuration device configures one or more pieces of QCL information for at least one control resource set by: configuring different pieces of QCL information for the downlink control channels at different aggregation levels in each control resource set, or configuring different pieces of QCL information for different candidates of the downlink control channels at different aggregation levels in each control resource set, or configuring multiple different pieces of QCL information for each candidate in each control resource set.

In one embodiment, the first transmitting device transmits the first downlink control channel configuration information to the terminal by: transmitting the first downlink control channel configuration information to the terminal through a radio resource control signaling, or transmitting the first downlink control channel configuration information to the terminal through a message 2 or a message 4 in a random access procedure.

In one embodiment, the device further includes an adjustment device. The adjustment device is configured to adjust the at least one beam direction for transmitting the downlink control information of the terminal. The first transmitting device is further configured to transmitting second downlink control channel configuration information for instructing the base station to adjust the at least one beam direction for transmitting the downlink control information of the terminal.

In one embodiment, the first transmitting device transmits the second downlink control channel configuration information for instructing the base station to adjust the at least one beam direction for transmitting the downlink control information of the terminal by transmitting the second downlink control channel configuration information to the terminal through a L1 signaling or an MAC CE.

According to a fourth aspect, a downlink control information reception device is provided, including: a receiving device, configured to receive first downlink control channel configuration information transmitted by a base station, the first downlink control channel configuration information including information of at least one beam direction determined by the base station and configured to transmit downlink control information of the terminal; a second determining device, configured to determine the at least one beam direction according to the first downlink control channel configuration information; and a monitoring device, configured to monitor and receive the downlink control information in the at least one beam direction.

In one embodiment, the operation that the second determining device determines the at least one beam direction according to the first downlink control channel configuration information by determining, according to the first downlink control channel configuration information, a beam direction distributed by the base station for at least one control resource set. The at least one control resource set is a control resource set configured by the base station for the terminal and configured to transmit the downlink control information. The base station distributes the same or different beam directions for different control resource sets in the at least one control resource set. The beam directions distributed for different candidates of a downlink control channel carrying the downlink control information in each control resource set are the same or different.

In one embodiment, the first downlink control channel configuration information includes QCL information. When the QCL information takes a reference signal of the beam management procedure as a base signal, the terminal demodulates relative parameter information between a reference signal of the downlink control channel carrying the downlink control information and the reference signal of the beam management procedure of the terminal. Or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates relative parameter information between the reference signal of the downlink control channel carrying the downlink control information and the reference signal of the downlink synchronization procedure or the terminal demodulates relative parameter information between the reference signal of the downlink control channel carrying the downlink control information and the reference signal of the downlink synchronization procedure and the demodulation reference signal used for demodulating the broadcast information carried by the physical broadcast channel.

In one embodiment, the second determining device determines, according to the first downlink control channel configuration information, a beam direction distributed by the base station for at least one control resource set by:

when determining that the base station configures one piece of QCL information for at least one control resource set, determining the beam direction corresponding to each control resource set according to the QCL information, or when determining that the base station configures multiple pieces of QCL information for at least one control resource set, determining, according to the QCL information, beam directions corresponding to the downlink control channels at different aggregation levels in each control resource set, or beam directions corresponding to different candidates of the downlink control channels at different aggregation levels or multiple beam directions corresponding to each candidate in each control resource set.

In one embodiment, the device further includes a generation device and a second transmitting device. The generation device is configured to generate beam direction information according to received signal strength in different beam directions of the base station before the receiving device receives the first downlink control channel configuration information transmitted by the base station. The second transmitting device is configured to transmit the beam direction information to the base station. The beam direction information indicates the beam direction in which the base station transmits the control information to the terminal.

In one embodiment, the receiving device receives the first downlink control channel configuration information transmitted by the base station by receiving the first downlink control channel configuration information contained in a radio resource control signaling transmitted by the base station, or receiving the first downlink control channel configuration information contained in a message 2 or a message 4 transmitted by the base station in a random access procedure.

In one embodiment, the receiving device is further configured to receive second downlink control channel configuration information transmitted by the base station, the second downlink control channel configuration information being used for instructing the base station to adjust at least one beam direction for transmitting the downlink control information of the terminal. The second determining device is further configured to determine at least one adjusted beam direction according to the second downlink control channel configuration information. The monitoring device is further configured to monitor and receive the downlink control information in at least one adjusted beam direction.

In one embodiment, the receiving device receives the second downlink control channel configuration information transmitted by the base station by receiving the second downlink control channel configuration information transmitted by the base station through a L1 signaling or an MAC CE.

According to a fifth aspect, a computer apparatus is provided, including a processor used for implementing steps of any one of the downlink control information transmission method provided by the first aspect and the downlink control information reception method provided by the second aspect when executing computer programs stored in a memory.

According to a sixth aspect, a computer readable storage medium is provided, which stores computer programs. When the computer programs are executed by a processor, steps of any one of the downlink control information transmission method provided by the first aspect and the downlink control information reception method provided by the second aspect are implemented.

In the embodiments of the present disclosure, the base station may further transmit the first downlink control channel configuration information to the terminal at first before transmitting the downlink control information. The first downlink control channel configuration information is used for indicating the beam direction of the downlink control information transmitted by the base station to the terminal. The terminal may monitor and receive the downlink control information in the corresponding beam direction after receiving the first downlink control channel configuration information, so that the terminal may accurately and timely acquire the downlink control information transmitted by the base station to reduce the time delay of data transmission. In this way, the terminal does not need to monitor the information in any direction, but only monitors the information in the corresponding beam direction, to save more electricity.

BRIEF DESCRIPTION OF THE DRAWINGS

To describe the technical solutions of the embodiments of the present disclosure more clearly, drawings required to be used in the embodiments of the present disclosure will be briefly introduced below. Obviously, the drawings described below are only some embodiments of the present disclosure. Those ordinarily skilled in the art also can acquire other drawings according to the provided drawings without doing creative work.

DETAILED DESCRIPTION OF THE EMBODIMENTS

Figure 1:
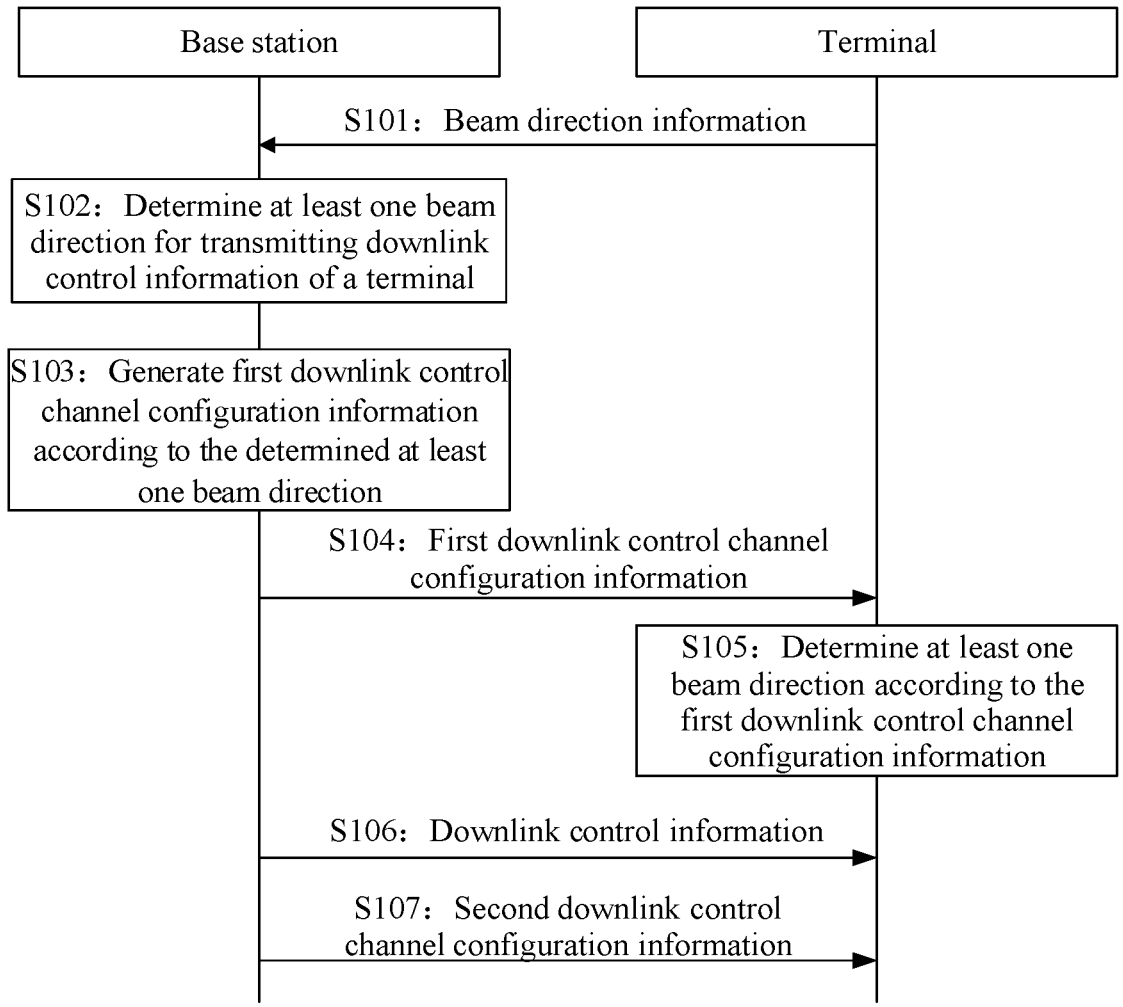
FIG. 1 is a schematic flow diagram of downlink control information transmission and reception methods provided by the embodiments of the present disclosure.

In order to make the objectives, technical solutions and advantages of the embodiments of the present disclosure clearer, the technical solutions in the embodiments of the present disclosure are described clearly and completely below in conjunction with the drawings in the embodiments of the present disclosure.

Part of wordings in the embodiments of the present disclosure are explained and described below such that persons skilled in the art can understand.

(1) Base station refers to a device that communicates with a wireless terminal device on an air interface in an access network through one or more cells. The base station may be used for mutually converting a received air frame and an internet protocol (IP) packet, and used as a router between user equipment and other portions of the access network. The other portions of the access network may include an IP network. The base station may further coordinate the attribute management of the air interface. For example, the base station may include an evolutional Node B (eNB) in a long term evolution (LTE) system or an LTE-Advanced (LTE-A) system, or may also include a next generation node B (gNB) in a 5G system. The embodiment of the present disclosure is not limited thereto.

(2) Terminal refers to a device for providing speech and/or data connectivity, and may include, for example, a handheld device having a wireless connection function, or a processing device connected to a wireless modem. The user equipment may communicate with a core network through a radio access network (RAN) and exchange speech and/or data with the RAN. The terminal may include user equipment (UE), a wireless terminal, a mobile terminal, a subscriber device, a subscriber station, a mobile station, a mobile, a remote station, an access point (AP), a remote terminal, an access terminal, a user terminal, a user agent or a user device and the like, and may include, for example, a mobile phone (or "cell" phone), a computer having the mobile terminal, and a portable, mini, handheld, computer-built-in or vehicle-mounted mobile apparatus, such as a personal communication service (PCS) phone, a cordless telephone, a session initiation protocol (SIP) phone, a wireless local loop (WLL) station, a personal digital assistant (PDA) and a smart wearable device.

The technical background of the embodiments of the present disclosure is described below.

At present, each downlink subframe in the LTE communication system includes a control region and a data region. The control region is used for carrying control information, and the data region is used for carrying data. For example, a PDCCH is located in the control region. The control region of each downlink subframe may include a plurality of PDCCHs, and one PDCCH occupies a control channel element (CCE). The base station may use 1, 2, 4, or 8 CCEs to carry one piece of downlink control information. The number 1, 2, 4, or 8 is an aggregation level (AL) of a PDCCH. Each aggregation level corresponds to a candidate of the PDCCH at this aggregation level. The base station may configure a corresponding aggregation level according to transmitted information amount and channel conditions. Since the terminal does not know information such as size and format of the PDCCH for carrying the downlink control information except desired information, it may try to decode the downlink control information in the control region to find out a CCE aggregation level and a CCE initial position which are included in the downlink control information transmitted by the base station to it, and then determine the downlink control information transmitted by the base station to it, to receive the downlink control information. This process is called PDCCH blind detection.

The PDCCH blind detection is performed on the basis that the current terminal monitors and receives the downlink control information in any direction. In a future wireless communication system, such as a 5 Generation (5G) mobile communication technology, in order to increase the utilization rate of the frequency domain resources, a band with a higher frequency, such as 6 GHz or above or dozens of GHz, may be also used to transmit data. When the high-frequency band transmits the data, a signal of the high-frequency band is attenuated faster, so that in order to resist the faster attenuation to guarantee the communication quality, data transmission needs to be performed through a beam mode. Since the signal strength outside a beam direction is extremely low, corresponding information may be only monitored and received in a correct beam direction. Therefore, a current mode of the terminal for monitoring and receiving the downlink control information in the random direction is not applicable to the future wireless communication system.

In view of this, an embodiment of the present disclosure provides a downlink control information transmission method. In this method, the base station may further transmit first downlink control channel configuration information to the terminal at first before transmitting the downlink control information. The first downlink control channel configuration information is used for indicating a beam direction of the downlink control information transmitted by the base station to the terminal. The terminal may monitor and receive the downlink control information in the corresponding beam direction after receiving the first downlink control channel configuration information, so that the terminal may accurately and timely acquire the downlink control information transmitted by the base station to reduce the time delay of data transmission. In this way, the terminal does not need to monitor the information in any direction, but only monitors the information in the corresponding beam direction, to save more electricity of the terminal.

Referring to FIG. 1, one embodiment of the present disclosure provides a downlink control information transmission method. The flow of the method is described below. In the following flow, the flow of a downlink control information reception method is also involved.

Step S101: a terminal transmits beam direction information to a base station, and the base station receives the beam direction information.

In the embodiment of the present disclosure, when the base station needs to transmit the downlink control information to the terminal, the base station needs to determine a beam direction for transmitting the downlink control information at first. If the base station desires to determine the beam direction for transmitting the downlink control information, a general position of the terminal within a base station coverage range needs to be obtained at first. The step that the base station determines the general position of the terminal includes, but not limited to, the following several methods.

(1) The base station may determine the general position of the terminal in a beam management procedure of the terminal. Specifically, the base station may transmit test information to the terminal in different beam directions. After the terminal receives the test information in different beam directions, received signal strength in different beam directions may be determined, and then one piece of beam direction information is generated according to the signal strength. The beam direction information is transmitted to the base station. The beam direction information is used for indicating a beam direction in which the base station may transmit the downlink control information to the terminal, such as the beam direction with the highest signal strength or the signal strength greater than a certain threshold in the beam direction information. Correspondingly, the base station may receive the beam direction information, and determine the general position of the terminal according to the received beam direction information.

(2) The base station may determine the general position of the terminal in a downlink synchronization procedure or a random access procedure of the terminal. Specifically, in the downlink synchronization procedure of the terminal and the base station or the random access procedure, the terminal may directly transmit the beam direction information to the base station. Correspondingly, the base station may receive the beam direction information, and determine the general position of the terminal according to the received beam direction information.

In the embodiment of the present disclosure, in order to describe the flow more clearly according to the order, Step S101 is shown in FIG. 1 together, but it should be noted that Step S101 is not a step that must be performed. For example, in addition to the above two methods, the base station may further determine the general position of the terminal according to a moving track or a moving speed of the terminal. Of course, the general position of the terminal may also be determined by other possible modes, and the embodiment of the present disclosure is not limited thereto.

Step 102: the base station determines at least one beam direction for transmitting the downlink control information of the terminal.

In the embodiment of the present disclosure, the base station may determine the general position of the terminal according to the received beam direction information, and then determine the at least one beam direction for transmitting the downlink control information to the terminal. Of course, the base station may also determine the beam direction indicated in the beam direction information and having higher signal strength as the at least one beam direction for transmitting the downlink control information to the terminal. The base station may determine the number of beam directions according to information, such as the format, of the to-be-transmitted downlink control information. Of course, the base station may also determine the number of beam directions according to other possible information, and the embodiment of the present disclosure is not limited thereto.

Step S103: the base station generates first downlink control channel configuration information according to the determined at least one beam direction.

In the embodiment of the present disclosure, after determining the at least one beam direction for transmitting the downlink control information of the terminal, the base station may generate the first downlink control channel configuration information according to the at least one beam direction. The first downlink control channel configuration information may include Quasi-co-location (QCL) information. When the QCL information takes a reference signal of the beam management procedure as a base signal, the terminal demodulates difference information between a reference signal of a downlink control channel carrying the downlink control information and the reference signal of the beam management procedure of the terminal. Or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates difference information between the reference signal of the downlink control channel carrying the downlink control information and the reference signal of the downlink synchronization procedure or the demodulation reference signal used for demodulating the broadcast information carried by the physical broadcast channel. Of course, the first downlink control channel configuration information may further include other parameter information, and the embodiment of the present disclosure is not limited thereto.

Specifically, the base station may distribute, according to the determined at least one beam direction, a beam direction for at least one control resource set (CORESET) configured by the base station for the terminal. The control resource set is a set of resources for transmitting the downlink control information. The base station may distribute different or same beam directions for each control resource set. Furthermore, the base station may also distribute different or same beam directions for different control resource sets.

Specifically, when the base station only distributes one beam direction for each control resource set, the base station may configure one piece of QCL information related to the beam direction for each control resource set.

Figure 2:
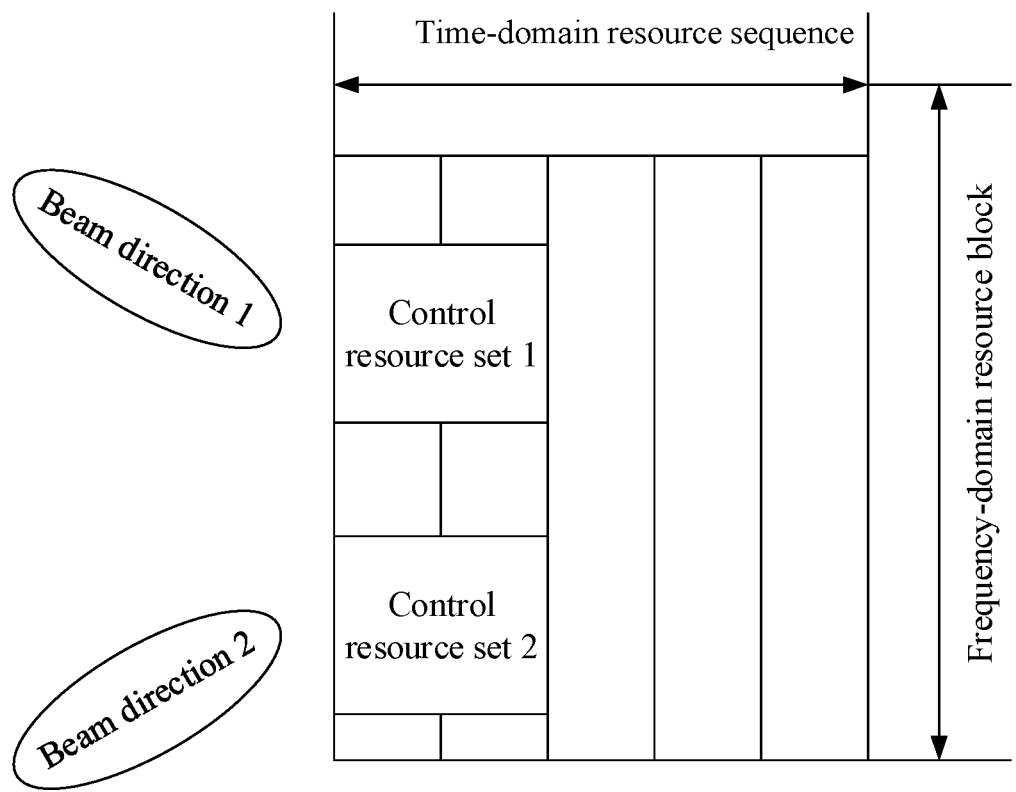
FIG. 2 is a schematic diagram showing that a base station provided by an embodiment of the present disclosure distributes a beam direction for each control resource set.

FIG. 2 is a schematic diagram showing that the base station distributes one beam direction for each control resource set. The base station configures two control resource sets for the terminal, namely a control resource set 1 and a control resource set 2, and then the base station may distribute one beam direction for the control resource set 1 and the control resource set 2, respectively, namely distribute a beam direction 1 for the control resource set 1 and distribute a beam direction 2 for the control resource set 2. Correspondingly, after determining the distributed beam directions, the base station may configure the QCL information, related to the distributed beam directions, for the two control resource sets. For example, the base station configures the QCL1 information, related to the beam direction 1, for the control resource set 1 and configures the QCL2 information, related to the beam direction 1, for the control resource set 2. The beam direction 1 and the beam direction 2 may be the same beam directions, and may also be different beam directions. Correspondingly, when the beam direction 1 and the beam direction 2 are the same beam directions, the base station configures same QCL information for the two control resource sets, namely the QCL1 information and the QCL2 information are the same. When the beam direction 1 and the beam direction 2 are the different beam directions, the base station configures different QCL information for the two control resource sets, namely the QCL1 information and the QCL2 information are different.

Specifically, when the base station distributes a plurality of beam directions for each control resource set, that is, when the base station configures multiple pieces of QCL information for each control resource set, there are, but not limited to, two cases below.

(1) The base station may distribute different beam directions for downlink control channels at different aggregation levels in this control resource set, and then the base station may configure different QCL information for the downlink control channels at different aggregation levels.

Figure 3:
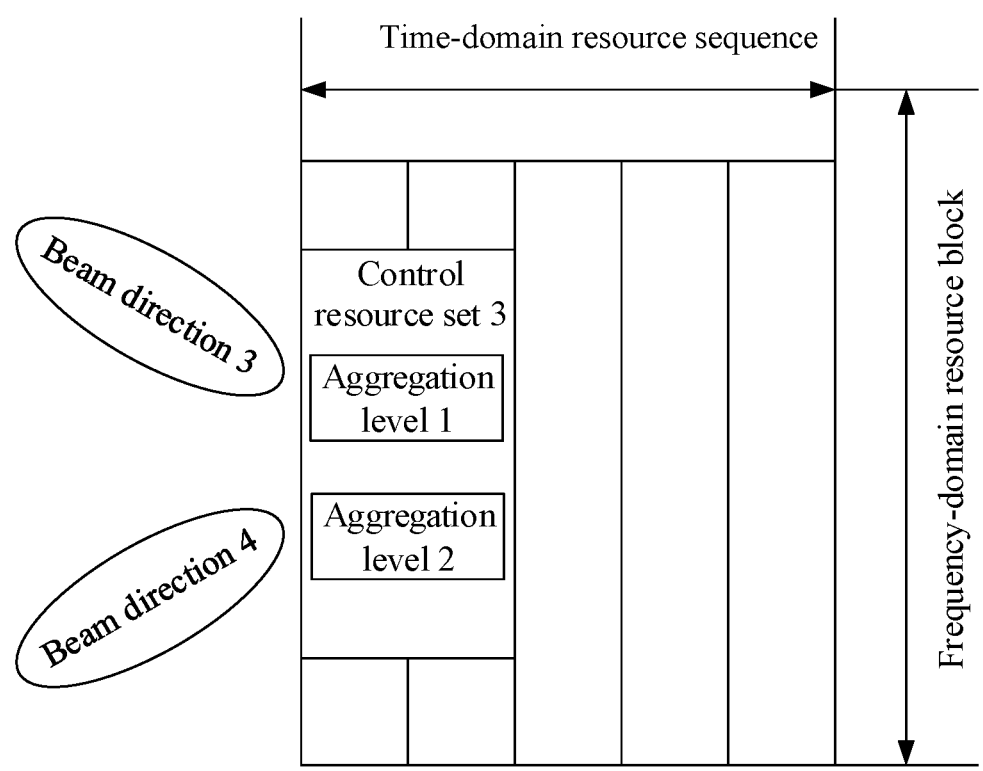
FIG. 3 is a schematic diagram showing that a base station provided by an embodiment of the present disclosure distributes different beam directions for downlink control channels at different aggregation levels in each control resource set.

FIG. 3 is a schematic diagram showing that the base station distributes different beam directions for the downlink control channels at different aggregation levels in each control resource set. The base station configures one control resource set 3 for the terminal. The control resource set 3 includes downlink control channels at two aggregation levels, namely an aggregation level 1 and an aggregation level 2. The base station may distribute a beam direction 3 for the downlink control channel at the aggregation level 1 and distribute a beam direction 4 for the downlink control channel at the aggregation level 2. Correspondingly, after the distribution of the beam directions is completed, the base station may configure QCL3 information, related to the beam direction 3, for the downlink control channel at the aggregation level 1, and configure QCL4 information, related to the beam direction 4, for the downlink control channel at the aggregation level 2.

(2) The base station may distribute different beam directions for different candidates of the downlink control channels at different aggregation levels in this control resource set, and then the base station may configure different QCL information for the different candidates of the downlink control channels at different aggregation levels.

Figure 4:
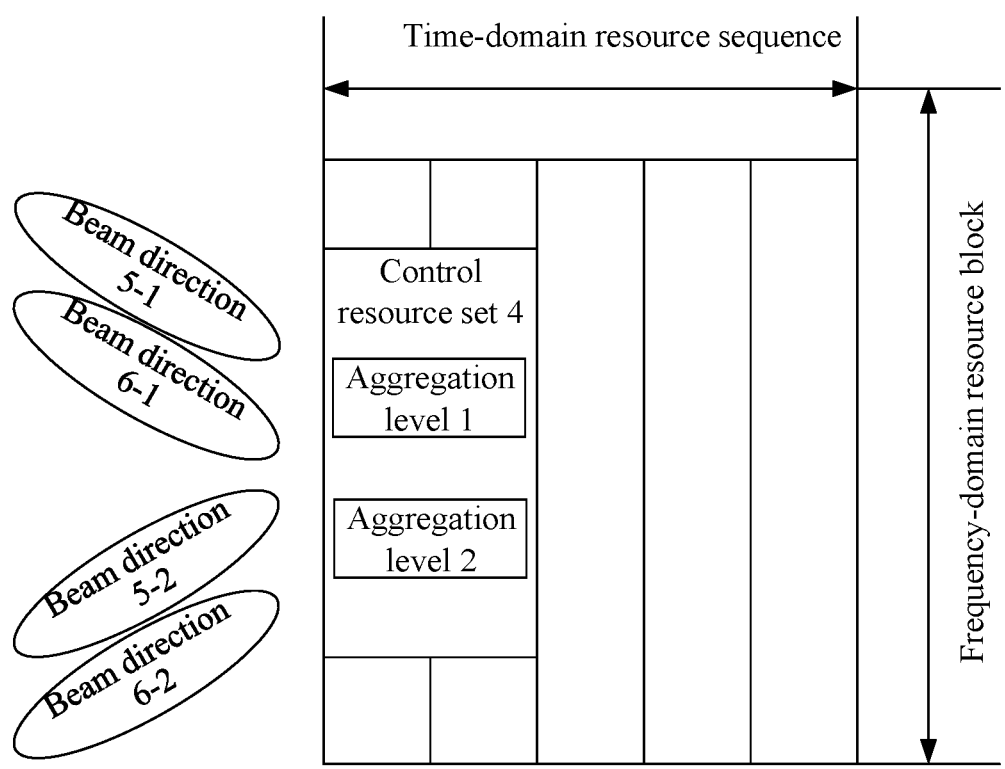
FIG. 4 is a schematic diagram showing that a base station provided by an embodiment of the present disclosure distributes different beam directions for different candidates of downlink control channels at different aggregation levels in each control resource set.

FIG. 4 is a schematic diagram showing that the base station distributes different beam directions for different candidates of the downlink control channels at different aggregation levels in each control resource set. The base station configures one control resource set 4 for the terminal. The control resource set 4 includes downlink control channels at two aggregation levels, namely an aggregation level 1 and an aggregation level 2. Each aggregation level may include a plurality of candidates. For example, the aggregation level 1 includes N candidates, and the aggregation level 2 includes M candidates. The base station may distribute a beam direction 5-1 for the N/2 candidates at the aggregation level 1, and distribute a beam direction 6-1 for the rest N/2 candidates. The base station may distribute a beam direction 5-2 for the M/2 candidates at the aggregation level 2, and distribute a beam direction 6-2 for the rest M/2 candidates. Correspondingly, after the distribution of the beam directions is completed, the base station may also configure QCL5 information, related to the beam direction 5-1, for the N/2 candidates at the aggregation level 1 and configure QCL6 information, related to the beam direction 6-1, for the rest N/2 candidates, and may configure the QCL5 information, related to the beam direction 5-2, for the M/2 candidates at the aggregation level 2 and configure the QCL6 information, related to the beam direction 6-2, for the rest M/2 candidates. It should be noted that the beam direction 5-1 and the beam direction 5-2 here may be the same, and then the QCL information related to the beam direction 5-1 and the QCL information related to the beam direction 5-2 are the same. The above is taken as an example. Of course, the beam direction 5-1 and the beam direction 5-2 may also be different, and then correspondingly, the QCL information related to the beam direction 5-1 and the QCL information related to the beam direction 5-2 are different. In a similar way, the beam direction 6-1 and the beam direction 6-2 are similar to those above, and descriptions thereof are omitted herein.

The base station may also distribute multiple beam directions for each candidate, and correspondingly, the base station may configure multiple pieces of QCL information respectively corresponding to the multiple beam directions for this candidate.

In the embodiment of the present disclosure, in order to enable the terminal to know corresponding relationships between the multiple pieces of QCL information and different control resource sets, or corresponding relationships between the multiple pieces of QCL information and the downlink control channels at different aggregation levels, or corresponding relationships between the multiple pieces of QCL information and different candidates, the base station may enable the first downlink control channel configuration information transmitted to the terminal to include information used for indicating the above corresponding relationships. The first downlink control channel configuration information may be transmitted by the base station to the terminal through a RRC signaling or a message 2 or a message 4 in a random process, or the indicating message may also be transmitted by the base station to the terminal through a Layer 1 (L1) signal or a Medium Access Control Control Element (MAC CE). Of course, the base station may also inform the terminal of the above corresponding relationships by transmitting an extra indicating message to the terminal. The embodiment of the present disclosure is not limited thereto. Or, the base station and the terminal may pre-agree one of the above corresponding relationships, and then the first downlink control channel configuration information transmitted by the base station to the terminal may not include the information used for indicating the above corresponding relationships, and the base station do not need to transmit the extra indicating message to the terminal. The terminal may determine the corresponding relationships between the multiple pieces of QCL information and different control resource sets, or the corresponding relationships between the multiple pieces of QCL information and the downlink control channels at different aggregation levels, or the corresponding relationships between the multiple pieces of QCL information and different candidates in a pre-agreement manner.

Step S104: the base station transmits the first downlink control channel configuration information, and the terminal receives the first downlink control channel configuration information.

In the embodiment of the present disclosure, after generating the first downlink control channel configuration information, the base station may transmit the first downlink control channel configuration information to the terminal. Specifically, the base station may transmit the first downlink control channel configuration information to the terminal through the radio resource control (RRC) signaling, or the base station may also transmit the first downlink control channel configuration information to the terminal through a second message (message 2) or a fourth message (message 4) of the terminal in the random access procedure. Of course, the base station may also transmit the first downlink control channel configuration information to the terminal by other possible modes, and the embodiment of the present disclosure is not limited thereto.

Correspondingly, the terminal may receive the first downlink control channel configuration information transmitted by the base station.

Step S105: the terminal determines at least one beam direction according to the first downlink control channel configuration information.

In the embodiment of the present disclosure, after receiving the first downlink control channel configuration information transmitted by the base station, the terminal may acquire the QCL information included in the first downlink control channel configuration information, and then determine, according to the QCL information, the beam direction for transmitting the downlink control information.

In the embodiment of the present disclosure, if the terminal determines that the base station distributes one beam direction for each control resource set, that is, when the base station configures one piece of QCL information for each control resource set, the terminal receives only one piece of QCL information that corresponds to the control resource set, and determines the beam direction corresponding to this QCL information according to this QCL information.

In the embodiment of the present disclosure, if the terminal determines that the base station distributes a plurality of beam directions for each control resource set, that is, when the base station configures multiple pieces of QCL information for each control resource set, such as a configuration mode illustrated in FIG. 3 and FIG. 4, the terminal receives multiple pieces of QCL information that correspond to the control resource set, and may respectively determine, according to the multiple pieces of QCL information, the beam direction corresponding to each of the multiple pieces of QCL information. When the base station distributes different beam directions for different candidates of the downlink control channels at different aggregation levels in each control resource set, the terminal may further determine the beam directions corresponding to the different candidates.

Specifically, if the first downlink control channel configuration information transmitted by the base station includes information of the corresponding relationships between the multiple pieces of QCL information and different control resource sets, or the corresponding relationships between the multiple pieces of QCL information and the downlink control channels at different aggregation levels, or the corresponding relationships between the multiple pieces of QCL information and different candidates, after receiving the first downlink control channel configuration information, the terminal may determine, according to the QCL information and the information of the above corresponding relationships included in the first downlink control channel configuration information, the QCL information configured by the base station for each control resource set of the terminal, or the QCL information configured by the base station for downlink control channels at different aggregation levels, or the QCL information configured by the base station for each candidate. Since the QCL information is related to the beam direction, the terminal may determine the beam direction corresponding to each control resource set, or the beam directions corresponding to the downlink control channels at different aggregation levels, or the beam direction corresponding to each candidate after determining the corresponding relationship. There is one or more beam directions corresponding to each candidate.

Specifically, in the following, but not limited to, several cases, the terminal may determine the corresponding beam direction according to one of the corresponding relationships pre-agreed with the base station.

(1) When the corresponding relationship pre-agreed by the terminal and the base station is that the base station configures different pieces of QCL information for the downlink control channels at different aggregation levels in this resource set, the terminal may directly determine the beam directions corresponding to the multiple pieces of QCL information according to the multiple pieces of QCL information and determine the beam directions corresponding to the downlink control channels at different aggregation levels after receiving the first downlink control channel configuration information and acquiring the multiple pieces of QCL information included therein. In the case exemplified in FIG. 3, the terminal may know according to the QCL3 information that the beam direction of the downlink control channel at the aggregation level 1 included in the control resource set 3 is the beam direction 3, and know according to the QCL 4 information that the beam direction of the downlink control channel at the aggregation level 2 included in the control resource set 3 is the beam direction 4.

(2) When the corresponding relationship pre-agreed by the terminal and the base station is that the base station configures different pieces of QCL information for different candidates of the downlink control channels at different aggregation levels in this resource set, the terminal may directly determine the beam directions corresponding to the multiple pieces of QCL information according to the multiple pieces of QCL information and determine the beam directions corresponding to different candidates after receiving the first downlink control channel configuration information and acquiring the multiple pieces of QCL information included therein. In the case exemplified in FIG. 4, the terminal may know according to the QCL5 information that the beam direction of the N/2 candidates at the aggregation level 1 included in the control resource set 4 is the beam direction 5-1 and the beam direction of the M/2 candidates at the aggregation level 2 is the beam direction 5-2, and the terminal may know according to the QCL6 information that the beam direction of the rest N/2 candidates at the aggregation level 2 included in the control resource set 4 is the beam direction 6-1 and the beam direction of the rest M/2 candidates at the aggregation level 2 is the beam direction 6-2.

(3) When the corresponding relationship pre-agreed by the terminal and the base station is that when the base station configures multiple pieces of QCL information for each candidate in the control resource set, the terminal may determine the beam directions corresponding to the multiple pieces of QCL information of this candidate according to the multiple pieces of QCL information.

Step S106: the base station transmits the downlink control information, and the terminal monitors and receives the downlink control information.

In the embodiment of the present disclosure, after determining the beam direction for transmitting the downlink control information, the base station may transmit the downlink control information to the terminal in the beam direction.

In the embodiment of the present disclosure, the terminal may monitor the downlink control information in the determined at least one beam direction. The way for the terminal to monitor the downlink control information in an appointed region belongs to the scope of the prior art, so that the descriptions thereof are omitted in the embodiment of the present disclosure.

In the embodiment of the present disclosure, after transmitting the downlink control information in the above determined at least one beam direction, the base station may further adjust the at least one beam direction. Specifically, when the base station acquires a better beam direction of the terminal through the beam management procedure, or when a certain beam direction in the at least one beam direction changes and is no longer available, the base station may adjust the at least one beam direction for transmitting the downlink control information, and generate second downlink control channel configuration information according to the adjusted at least one beam direction. The way to generate the second downlink control channel configuration information may refer to the foregoing content of generation of the first downlink control channel configuration information, and descriptions thereof are omitted herein. The method may further include:

step S107: the base station transmits the second downlink control channel configuration information to the terminal, and the terminal receives the second downlink control channel configuration information.

The base station may transmit the second downlink control channel configuration information to the terminal through the L1 signaling or the MAC CE. Of course, the base station may also enable the downlink control information transmitted to the terminal to carry the content included in the second downlink control channel configuration information.

In the embodiment of the present disclosure, after receiving the second downlink control channel configuration information, the terminal may know that the base station has adjusted the at least one beam direction for transmitting the downlink control information, and then the terminal may acquire the QCL information included in the second downlink control channel configuration information, re-determine at least one beam direction for transmitting the downlink control information, and monitor and receive the downlink control information in the adjusted at least one beam direction within the subsequent one or more slots.

In the embodiment of the present disclosure, in order to further achieve the beneficial effects, Step S107 is added. Although the step is shown in the figure, the beneficial effects of this application may be achieved when S106 is performed, that is, when the downlink control information is accurately received in the beam direction.

Based on the above, the base station may further transmit the first downlink control channel configuration information to the terminal at first before transmitting the downlink control information. The first downlink control channel configuration information is used for indicating the beam direction of the downlink control information transmitted by the base station to the terminal. In this way, the terminal may monitor and receive the downlink control information in the corresponding beam direction after receiving the first downlink control channel configuration information, so that the terminal may accurately and timely acquire the downlink control information transmitted by the base station to reduce the time delay of data transmission. Meanwhile, the terminal no longer needs to scan and monitor the information in all directions, so that more electricity of the terminal may be saved.

A device provided by an embodiment of the present disclosure is introduced below in conjunction with the drawings.

Figure 5:
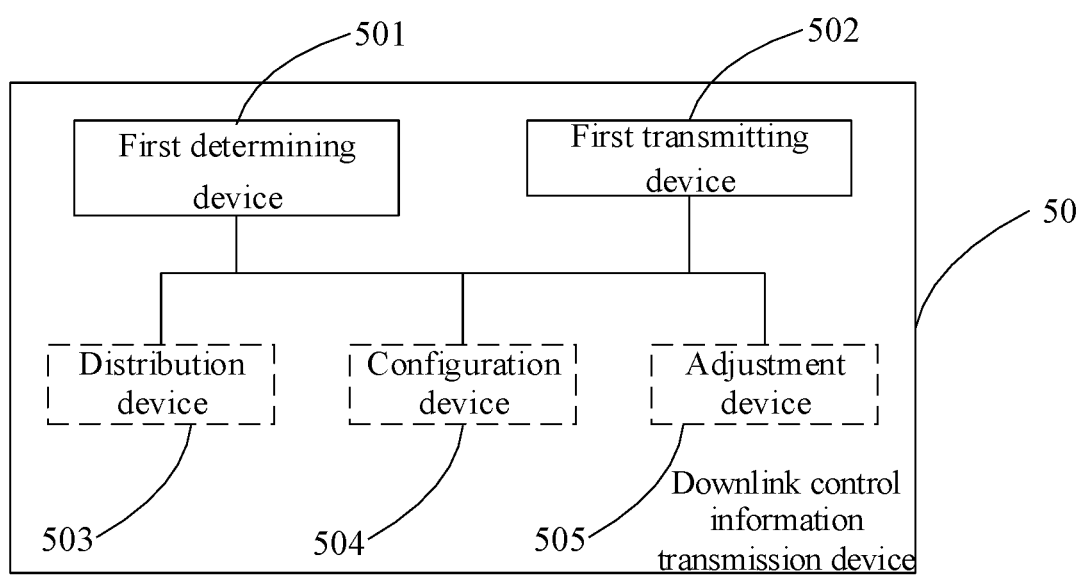
FIG. 5 is a structural schematic diagram of a downlink control information transmission device provided by an embodiment of the present disclosure.

Referring to FIG. 5, based on the same inventive concept, one embodiment of the present disclosure provides a downlink control information transmission device 50. The device includes:

a first determining device 501, configured to determine at least one beam direction for transmitting downlink control information of the terminal, and generating first downlink control channel configuration information according to the determined at least one beam direction, the first downlink control channel configuration information being used for indicating a beam direction of the downlink control information transmitted by the base station to the terminal;

a second transmitting device 502, configured to transmit the downlink control information to the terminal in the at least one beam direction after transmitting the first downlink control channel configuration information to the terminal.

In one embodiment, the first determining device 501 is further configured to: determine beam direction information through a beam management procedure before determining the at least one beam direction for transmitting the downlink control information of the terminal, the beam direction information indicating the beam direction in which the device transmits the control information to the terminal; or, determine the beam direction information in a random access procedure of the terminal. The operation that the first determining device 501 determines the at least one beam direction for transmitting the downlink control information of the terminal includes that the first determining device 501 determines the at least one beam direction for transmitting the downlink control information of the terminal according to the beam direction information.

In one embodiment, the first downlink control channel configuration information includes QCL information. When the QCL information takes a reference signal of the beam management procedure as a base signal, the terminal demodulates difference information between a reference signal of a downlink control channel carrying the downlink control information and the reference signal of the beam management procedure of the terminal. Or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates difference information between the reference signal of the downlink control channel carrying the downlink control information and the reference signal of the downlink synchronization procedure or the demodulation reference signal used for demodulating the broadcast information carried by the physical broadcast channel.

In one embodiment, the device further includes a distribution device 503. The distribution device 503 is configured to: distribute, according to the determined at least one beam direction, a beam direction for at least one control resource set configured by the base station for the terminal. The at least one control resource set is configured to transmit the downlink control information. The beam directions distributed for different control resource sets in the at least one control resource set are the same or different. The beam directions distributed for different candidates of the downlink control channel carrying the downlink control information in each control resource set are the same or different. The operation that the first determining device 501 generates the first downlink control channel configuration information according to the determined at least one beam direction includes that: the first determining device 501 generates the first downlink control channel configuration information according to a result of the distribution of the beam direction by the distribution device 503 for at least one control resource set.

In one embodiment, the device further includes a configuration device 504. The configuration device 504 is configured to: configure one or more pieces of QCL information for at least one control resource set after the distribution device 503 distributes, according to the determined at least one beam direction, the beam direction for least one control resource set configured by the base station for the terminal.

In one embodiment, the operation that the configuration device 504 configures one or more pieces of QCL information for at least one control resource set includes that: the configuration device 504 configures different pieces of QCL information for the downlink control channels at different aggregation levels in each control resource set, or the configuration device 504 configures different pieces of QCL information for different candidates of the downlink control channels at different aggregation levels in each control resource set, or the configuration device 504 configures multiple different pieces of QCL information for each candidate in each control resource set.

In one embodiment, the operation that the first transmitting device 502 transmits the first downlink control channel configuration information to the terminal includes that: the first transmitting device 502 transmits the first downlink control channel configuration information to the terminal through a radio resource control signaling, or the first transmitting device 502 transmits the first downlink control channel configuration information to the terminal through a message 2 or a message 4 in a random access procedure.

In one embodiment, the device further includes an adjustment device 505. The adjustment device 505 is configured to: adjust the at least one beam direction for transmitting the downlink control information of the terminal. The first transmitting device 502 is further configured to: transmit second downlink control channel configuration information for instructing the base station to adjust the at least one beam direction for transmitting the downlink control information of the terminal.

In one embodiment, the operation that the first transmitting device 502 transmits the second downlink control channel configuration information for instructing the base station to adjust the at least one beam direction for transmitting the downlink control information of the terminal includes that: the first transmitting device 502 transmits the second downlink control channel configuration information to the terminal through a L1 signaling or an MAC CE.

The device may be configured to execute the method provided by the embodiment shown in FIG. 1. For example, the device is the aforementioned base station. Therefore, functions realized by all the functional modules of the device and the like may refer to the descriptions of the embodiment shown in FIG. 1, and will not be repeatedly described. The distribution device 503, the configuration device 504 and the adjustment device 505 are not mandatory functional modules, so that they are represented by dotted lines in FIG. 5.

Figure 6:
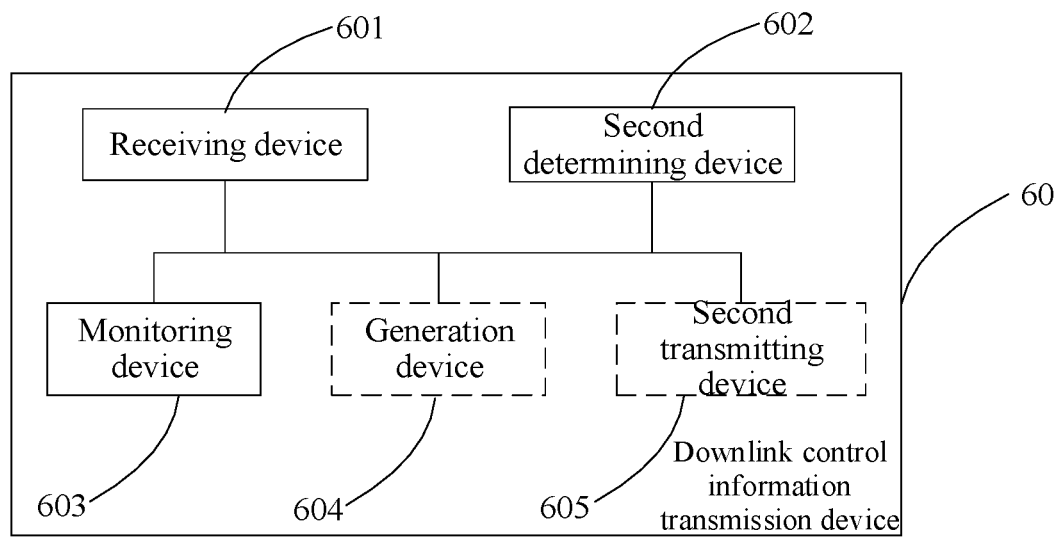
FIG. 6 is a structural schematic diagram of a downlink control information reception device provided by an embodiment of the present disclosure.

Referring to FIG. 6, based on the same inventive concept, one embodiment of the present disclosure provides a downlink control information reception device 60. For example, this device is the aforementioned terminal. The device includes:

a receiving device 601, configured to: receive first downlink control channel configuration information transmitted by the base station, the first downlink control channel configuration information including information of at least one beam direction determined by the base station and configured to transmit the downlink control information of the terminal;

a second determining device 602, configured to: determine the at least one beam direction according to the first downlink control channel configuration information; and a monitoring device 603, configured to: monitor and receive the downlink control information in the at least one beam direction.

In one embodiment, the operation that the second determining device 602 determines the at least one beam direction according to the first downlink control channel configuration information includes that: the second determining device 602 determines, according to the first downlink control channel configuration information, a beam direction distributed by the base station for at least one control resource set. The at least one control resource set is a control resource set configured by the base station for the terminal and configured to transmit the downlink control information. The base station distributes the same or different beam directions for different control resource sets in the at least one control resource set. The beam directions distributed for different candidates of a downlink control channel carrying the downlink control information in each control resource set are the same or different.

In one embodiment, the first downlink control channel configuration information includes QCL information. When the QCL information takes a reference signal of the beam management procedure as a base signal, the terminal demodulates relative parameter information between a reference signal of the downlink control channel carrying the downlink control information and the reference signal of the beam management procedure of the terminal. Or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates relative parameter information between the reference signal of the downlink control channel carrying the downlink control information and the reference signal of the downlink synchronization procedure or the demodulation reference signal used for demodulating the broadcast information carried by the physical broadcast channel.

In one embodiment, the operation that the second determining device 602 determines, according to the first downlink control channel configuration information, the beam direction distributed by the base station for at least one control resource set includes that: when the second determining device 602 determines that the base station configures one piece of QCL information for at least one control resource set, the second determining device 602 determines, according to the QCL information, the beam direction corresponding to each control resource set, or when the second determining device 602 determines that the base station configures multiple pieces of QCL information for at least one control resource set, the second determining device 602 determines, according to the QCL information, beam directions corresponding to the downlink control channels at different aggregation levels in each control resource set or beam directions corresponding to different candidates of the downlink control channels at different aggregation levels or multiple beam directions corresponding to each candidate in each control resource set.

In one embodiment, the device further includes a generation device 604 and a second transmitting device 605. The generation device 604 is configured to: generate beam direction information according to received signal strength in different beam directions of the base station before the receiving device 601 receives the first downlink control channel configuration information transmitted by the base station. The second transmitting device 605 is configured to: transmit the beam direction information to the base station. The beam direction information indicates the beam direction in which the base station transmits the control information to the terminal.

In one embodiment, the operation that the receiving device 601 receives the first downlink control channel configuration information transmitted by the base station includes that: the receiving device 601 receives the first downlink control channel configuration information contained in a radio resource control signaling transmitted by the base station, or the receiving device 601 receives the first downlink control channel configuration information contained in a message 2 or a message 4 transmitted by the base station in a random access procedure.

In one embodiment, the receiving device 601 is further configured to: receive second downlink control channel configuration information transmitted by the base station, the second downlink control channel configuration information being used for instructing the base station to adjust at least one beam direction for transmitting the downlink control information of the terminal. The second determining device 602 is further configured to: determine the adjusted at least one beam direction according to the second downlink control channel configuration information. The monitoring device 603 is further configured to: monitor and receive the downlink control information in the adjusted at least one beam direction.

In one embodiment, the operation that the receiving device 601 receives the second downlink control channel configuration information transmitted by the base station includes that: the receiving device 601 receives, through a L1 signaling or an MAC CE, the second downlink control channel configuration information transmitted by the base station.

The device may be configured to execute the method provided by the embodiment shown in FIG. 1. For example, the device is the aforementioned terminal. Therefore, functions realized by all the functional modules of the device and the like may refer to the descriptions of the embodiment shown in FIG. 1, and will not be repeatedly described. The generation device 604 and the second transmitting device 605 are not mandatory functional modules, so that they are represented by dotted lines in FIG. 6.

Figure 7:
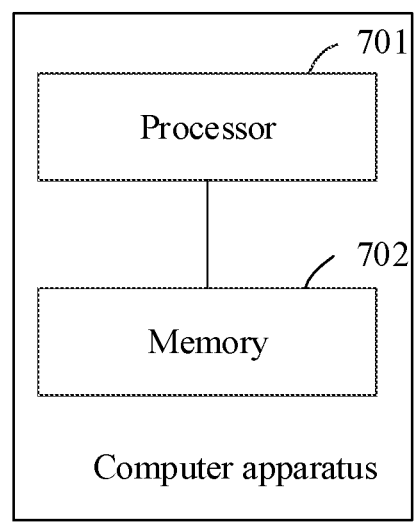
FIG. 7 is a structural schematic diagram of a computer apparatus provided by an embodiment of the present disclosure.

Referring to FIG. 7, one embodiment of the present disclosure further provides a computer apparatus including a processor 701. The processor 701 implements the steps of the downlink control information transmission and reception methods provided by the embodiments of the present disclosure when executing computer programs stored in a memory.

In one embodiment, the processor 701 may be specifically a central processing device and an application specific integrated circuit (ASIC), may be one or more integrated circuits configured to control program execution, may be a hardware circuit developed by a field programmable gate array (FPGA), and may be a baseband processor.

In one embodiment, the processor 701 may include at least one processing core.

In one embodiment, the computer apparatus further includes a memory 702. The memory 702 may include a read only memory (ROM), a random access memory (RAM), and a disk memory. The memory 702 is used for storing data required by operation of the processor 701. There is one or more memories 702. The memory 702 is shown in FIG. 7, but it should be noted that the memory 702 is not a mandatory functional module, so that it is represented by a dotted line in FIG. 7.

In the embodiment of the present disclosure, it should be understood that the disclosed devices and methods may be implemented in other manners. For example, the device embodiments described above are merely illustrative. For example, the division of the device or device is only a logical function division. In actual implementation, there may be another division manner. For example, a plurality of devices or components may be combined or integrated into another system, or some features may be ignored or not executed. In addition, the mutual coupling or direct coupling or communication connection shown or discussed may be indirect coupling or communication connection through some interfaces, devices or devices, and may be in electrical or other forms.

The functional devices in the embodiments of the present disclosure may be integrated into one processing device, or each device may also be an independent physical module.

The integrated device, if implemented in the form of a software functional device and sold or used as a standalone product, may be stored in a computer readable storage medium. Based on such understanding, all or part of the technical solutions of the embodiments of the present disclosure may be embodied in the form of a software product, and the computer software product is stored in a storage medium, including a plurality of instructions used for enabling a computer device, such as a personal computer, a server or a network device, or a processor to perform all or part of the steps of the methods described in various embodiments of the present disclosure. The foregoing storage medium includes: various media capable of storing program codes, such as a universal serial bus (USB) flash drive, a mobile hard disk, a read-only memory (ROM), a random access memory (RAM), a magnetic disk or an optical disk.

The above embodiments are only used to describe the technical solutions of the present disclosure in detail, but the descriptions of the above embodiments are only to facilitate the understanding of the embodiments of the present disclosure, and should not be construed as limiting the embodiments of the present disclosure. Variations or substitutions that may be readily conceived by those skilled in the art shall all fall within the protection scope of the present disclosure.

What is claimed is:

1. A downlink control information transmission method, comprising:
    determining, by a base station, at least one beam direction for transmitting downlink control information of a terminal, and generating, by the base station, first downlink control channel configuration information according to at least one determined beam direction, the first downlink control channel configuration information being used for indicating a beam direction of the downlink control information transmitted by the base station to the terminal;
    transmitting, by the base station, the downlink control information to the terminal in the at least one beam direction after the base station transmits the first downlink control channel configuration information to the terminal;
    wherein the generating, by the base station, first downlink control channel configuration information according to the determined at least one beam direction comprises:
    distributing, by the base station according to the at least one determined beam direction, a beam direction for at least one control resource set configured by the base station for the terminal, wherein the at least one control resource set is configured to transmit the downlink control information, and the beam directions for different control resource sets in the at least one control resource set are same or different, and the beam directions distributed for different candidates of the downlink control channel carrying the downlink control information in each control resource set are same or different;
    generating, by the base station, the first downlink control channel configuration information according to a result of distribution of the beam direction for at least one control resource set;
    wherein after the distributing, by the base station according to at least one determined beam direction, a beam direction for at least one control resource set allocated by the base station to the terminal, the method further comprises:
    configuring, by the base station, one or more pieces of QCL information for the at least one control resource set.

2. The method according to claim 1, wherein
    before the determining, by a base station, at least one beam direction for transmitting downlink control information of the terminal, the method further comprises:
    determining, by the base station, beam direction information through a beam management procedure, the beam direction information indicating the beam direction in which the base station transmits the control information to the terminal; or,
    determining, by the base station, the beam direction information in a random access procedure of the terminal;
    the determining, by a base station, at least one beam direction for transmitting downlink control information of the terminal comprises:
    determining, by the base station, the at least one beam direction for transmitting the downlink control information of the terminal according to the beam direction information.

3. The method according to claim 1, wherein the first downlink control channel configuration information comprises Quasi-co-location (QCL) information;
    when the QCL information takes a reference signal of a beam management procedure as a base signal, the terminal demodulates difference information between a reference signal of a downlink control channel carrying the downlink control information and the reference signal of the beam management procedure of the terminal; or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates difference information between the reference signal of the downlink control channel carrying the downlink control information and the reference signal of the downlink synchronization procedure or demodulates difference information between the reference signal of the downlink control channel carrying the downlink control information and the demodulation reference signal used for demodulating the broadcast information carried by the physical broadcast channel.

4. The method according to claim 1, wherein the configuring, by the base station, multiple pieces of QCL information for the at least one control resource set comprises:
    configuring, by the base station, different pieces of QCL information for the downlink control channels at different aggregation levels in each control resource set; or,
    configuring, by the base station, different pieces of QCL information for different candidates of the downlink control channels at different aggregation levels in each control resource set; or,
    configuring, by the base station, multiple different pieces of QCL information for each candidate in each control resource set.

5. The method according to claim 1, wherein the transmitting, by the base station, the first downlink control channel configuration information to the terminal comprises:
    transmitting, by the base station, the first downlink control channel configuration information to the terminal through a radio resource control signaling; or,
    transmitting, by the base station, the first downlink control channel configuration information to the terminal through a message 2 or a message 4 in a random access procedure.

6. The method according to claim 1, wherein after the transmitting, by the base station, the first downlink control channel configuration information to the terminal, the method further comprises:
    transmitting, by the base station, second downlink control channel configuration information for instructing the base station to adjust the at least one beam direction for transmitting the downlink control information of the terminal to the terminal through a layer 1 signaling or a media access control control element (MAC CE), if the base station adjusts the at least one beam direction for transmitting the downlink control information of the terminal.

7. A downlink control information reception method, comprising:
receiving, by a terminal, first downlink control channel configuration information transmitted by a base station, the first downlink control channel configuration information comprising information of at least one beam direction determined by the base station and configured to transmit downlink control information of the terminal;
determining, by the terminal, at least one beam direction according to the first downlink control channel configuration information; and
monitoring and receiving, by the terminal, the downlink control information in the at least one beam direction;
wherein the determining, by the terminal, the at least one beam direction according to the first downlink control channel configuration information comprises:
determining, by the terminal according to the first downlink control channel configuration information, a beam direction distributed by the base station for at least one control resource set the at least one control resource set is a control resource set configured by the base station for the terminal and configured to transmit the downlink control information; the base station distributes same or different beam directions for different control resource sets in the at least one control resource set and the beam directions distributed by the base station for different candidates of a downlink control channel carrying the downlink control information in each control resource set are same or different.

8. The method according to claim 7, wherein the first downlink control channel configuration information comprises Quasi-co-location (QCL) information;
when the QCL information takes a reference signal of a beam management procedure as a base signal, the terminal demodulates relative parameter information between a reference signal of the downlink control channel carrying the downlink control information and the reference signal of the beam management procedure of the terminal; or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates relative parameter information between the reference signal of the downlink control channel carrying the downlink control information and the reference signal of the downlink synchronization procedure or the demodulation reference signal used for demodulating the broadcast information carried by the physical broadcast channel.

9. The method according to claim 8, wherein the determining, by the terminal according to the first downlink control channel configuration information, a beam direction distributed by the base station for at least one control resource set comprises:
determining, by the terminal according to the one piece of QCL information, the beam direction corresponding to each control resource set when the terminal determines that the base station configures one piece of QCL information for the at least one control resource set; or,
determining, by the terminal according to the multiple pieces of QCL information, beam directions corresponding to candidates of the downlink control channels at different aggregation levels in each control resource set or beam directions corresponding to different candidates of the downlink control channels at different aggregation levels or multiple beam directions corresponding to each candidate in each control resource set when the terminal determines that the base station configures multiple pieces of QCL information for the at least one control resource set.

10. The method according to claim 7, wherein before the receiving, by the terminal, the first downlink control channel configuration information transmitted by the base station, the method further comprises:
generating, by the terminal, beam direction information according to received signal strength in the different beam directions of the base station; and
transmitting, by the terminal, the beam direction information to the base station, the beam direction information indicating the beam direction in which the base station transmits the control information to the terminal;
wherein the transmitting, by the terminal, the beam direction information to the base station comprises:
transmitting, by the terminal, the beam direction information to the base station in a beam management procedure of the base station; or,
transmitting, by the terminal, the beam direction information to the base station in a random access procedure.

11. The method according to claim 7, wherein the receiving, by the terminal, the first downlink control channel configuration information transmitted by the base station comprises:
receiving, by the terminal, the first downlink control channel configuration information contained in a radio resource control signaling transmitted by the base station; or,
receiving, by the terminal, the first downlink control channel configuration information contained in a message 2 or a message 4 transmitted by the base station in a random access procedure.

12. The method according to claim 7, further comprising:
receiving, by the terminal, second downlink control channel configuration information transmitted by the base station through a layer 1 signaling or a media access control control element (MAC CE), the second downlink control channel configuration information being used for instructing the base station to adjust at least one beam direction for transmitting the downlink control information of the terminal;
determining, by the terminal, at least one adjusted beam direction according to the second downlink control channel configuration information; and
monitoring and receiving, by the terminal, the downlink control information in the at least one adjusted beam direction.

13. A downlink control information transmission device, comprising a memory configured to store a computer readable program and a processor configured to execute the computer readable program to:
determine at least one beam direction for transmitting downlink control information of a terminal, and generate first downlink control channel configuration information according to at least one determined beam direction, the first downlink control channel configuration information being used for indicating a beam direction of the downlink control information transmitted by a base station to the terminal; and transmit the downlink control information to the terminal in at least one beam direction after the first downlink control channel configuration information is transmitted to the terminal;

the processor is configured to execute the computer readable program to generate the first downlink control channel configuration information according to at least one determined beam direction by:

distributing, according to at least one determined beam direction, a beam direction for at least one control resource set configured by the base station for the terminal; the at least one control resource set is configured to transmit the downlink control information; the beam directions distributed for different control resource sets in the at least one control resource set are same or different the beam directions distributed for different candidates of the downlink control channel carrying the downlink control information in each control resource set are same or different;

generating the first downlink control channel configuration information according to a result of the distribution of the beam direction for the at least one control resource set;

configuring one or more pieces of QCL information for at least one control resource set after distributing according to the at least one determined beam direction, the beam direction for at least one control resource set configured by the base station for the terminal.

14. The device according to claim 13, wherein the processor is further configured to execute the computer readable program to determine beam direction information through a beam management procedure before determining the at least one beam direction for transmitting the downlink control information of the terminal, the beam direction information indicating the beam direction in which the base station transmits the control information to the terminal; or, determine the beam direction information in a random access procedure of the terminal;

the processor is further configured to execute the computer readable program to determine the at least one beam direction for transmitting the downlink control information of the terminal by:

determining the at least one beam direction for transmitting the downlink control information of the terminal according to the beam direction information.

15. The device according to claim 14, wherein the first downlink control channel configuration information comprises Quasi-co-location (QCL) information;

when the QCL information takes a reference signal of the beam management procedure as a base signal, the terminal demodulates difference information between a reference signal of the downlink control channel carrying the downlink control information and the reference signal of the beam management procedure of the terminal; or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates difference information between the reference signal of the downlink control channel carrying the downlink control information and the reference signal of the downlink synchronization procedure or demodulates difference information between the reference signal of the downlink control channel carrying the downlink control information and the demodulation reference signal used for demodulating the broadcast information carried by the physical broadcast channel.

16. The device according to claim 13, wherein the processor is configured to execute the computer readable program to configure one or more pieces of QCL information for the at least one control resource set by:

configuring different pieces of QCL information for the downlink control channels at different aggregation levels in each control resource set; or, configuring different pieces of QCL information for different candidates of the downlink control channels at different aggregation levels in each control resource set; or, configuring multiple different pieces of QCL information for each candidate in each control resource set.

17. The device according to claim 13, wherein the processor is configured to execute the computer readable program to transmit the first downlink control channel configuration information to the terminal by:

transmitting the first downlink control channel configuration information to the terminal through a radio resource control signaling; or, transmitting the first downlink control channel configuration information to the terminal through a message 2 or a message 4 in a random access procedure.

18. The device according to claim 13, wherein the processor is further configured to execute the computer readable program to:

adjust the at least one beam direction for transmitting the downlink control information of the terminal;

transmit second downlink control channel configuration information for instructing the base station to adjust the at least one beam direction for transmitting the downlink control information of the terminal to the terminal through a layer 1 signaling or a media access control control element (MAC CE).

19. A downlink control information reception device, comprising a memory configured to store a computer readable program and a processor configured to execute the computer readable program to:

receive first downlink control channel configuration information transmitted by a base station, the first downlink control channel configuration information including information of at least one beam direction determined by the base station and configured to transmit downlink control information of a terminal;

determine the at least one beam direction according to the first downlink control channel configuration information; and monitor and receive the downlink control information in the at least one beam direction;

wherein the processor configured to execute the computer readable program to determine the at least one beam direction according to the first downlink control channel configuration information by:

determining, according to the first downlink control channel configuration information, a beam direction distributed by the base station for at least one control resource set the at least one control resource set is a control resource set configured by the base station for the terminal and configured to transmit the downlink control information; the base station distributes same or different beam directions for different control resource sets in the at least one control resource set the beam directions distributed for different candidates of a downlink control channel carrying the downlink control information in each control resource set are same or different.

20. The device according to claim 19, wherein the first downlink control channel configuration information comprises Quasi-co-location (QCL) information; when the QCL information takes a reference signal of a beam management procedure as a base signal, the terminal demodulates relative parameter information between a reference signal of the downlink control channel carrying the downlink control information and a reference signal of the beam management procedure of the terminal; or, when the QCL information takes a reference signal, received by the terminal, of a downlink synchronization procedure or a demodulation reference signal used for demodulating broadcast information that is received by the terminal and carried by a physical broadcast channel as the base signal, the terminal demodulates relative parameter information between the reference signal of the downlink control channel carrying the downlink control information and the reference signal of the downlink synchronization procedure or demodulates relative parameter information between the reference signal of the downlink control channel carrying the downlink control information and the demodulation reference signal used for demodulating the broadcast information carried by the physical broadcast channel.

21. The device according to claim 20, wherein the processor is configured to execute the computer readable program to determine, according to the first downlink control channel configuration information, a beam direction distributed by the base station for at least one control resource set by:
  when determining that the base station configures one piece of QCL information for the at least one control resource set, determining the beam direction corresponding to each control resource set according to the one piece of QCL information; or,
  when determining that the base station configures multiple pieces of QCL information for the at least one control resource set, determining, according to the first QCL information, beam directions corresponding to the downlink control channels at different aggregation levels in each control resource set, or beam directions corresponding to different candidates of the downlink control channels at different aggregation levels or multiple beam directions corresponding to each candidate in each control resource set.

22. The device according to claim 19, wherein the processor is further configured to execute the computer readable program to
  generate beam direction information according to received signal strength in different beam directions of the base station before receiving the first downlink control channel configuration information transmitted by the base station;
  transmitting the beam direction information to the base station, the beam direction information indicating the beam direction in which the base station transmits the control information to the terminal;
  wherein the receiving the first downlink control channel configuration information transmitted by the base station comprises:
  receiving the first downlink control channel configuration information contained in a radio resource control signaling transmitted by the base station; or,
  receiving the first downlink control channel configuration information contained in a message 2 or a message 4 transmitted by the base station in a random access procedure.

23. The device according to claim 19, wherein the processor is further configured to execute the computer readable program to:
  receive second downlink control channel configuration information transmitted by the base station through a L1 signaling or an MAC CE, the second downlink control channel configuration information being used for instructing the base station to adjust at least one beam direction for transmitting the downlink control information of the terminal;
  determine at least one adjusted beam direction according to the second downlink control channel configuration information; and
  monitor and receive the downlink control information in at least one adjusted beam direction.

* * * * *